(12) United States Patent
Lammers et al.

(10) Patent No.: US 10,512,249 B2
(45) Date of Patent: Dec. 24, 2019

(54) METHOD AND SYSTEM FOR GENERATING AN ATTENTION SIGNAL INDICATING A PROBLEM FOR AN ANIMAL

(71) Applicant: N.V. Nederlandsche Apparatenfabriek NEDAP, Groenlo (NL)

(72) Inventors: Rudie Jan Hendrik Lammers, Groenlo (NL); Arnoldus Gerardus Franciscus Harbers, Groenlo (NL)

(73) Assignee: N.V. NEDERLANDSCHE APPARATENFABRIEK NEDAP, Groenlo (NL)

( * ) Notice: Subject to any disclaimer, the term of this patent is extended or adjusted under 35 U.S.C. 154(b) by 83 days.

(21) Appl. No.: 15/811,971

(22) Filed: Nov. 14, 2017

(65) Prior Publication Data

US 2018/0132456 A1    May 17, 2018

(30) Foreign Application Priority Data

Nov. 14, 2016   (NL) ..................................... 2017785

(51) Int. Cl.
*A01K 29/00* (2006.01)
*A01K 11/00* (2006.01)
*G06F 17/18* (2006.01)

(52) U.S. Cl.
CPC .......... *A01K 29/005* (2013.01); *A01K 11/004* (2013.01); *G06F 17/18* (2013.01)

(58) Field of Classification Search
CPC ...... A01K 29/005; A01K 11/004; G06F 17/18
See application file for complete search history.

(56) References Cited

U.S. PATENT DOCUMENTS

| 10,405,957 B2* | 9/2019 | Kool ................... A61B 5/7282 |
| 2008/0255468 A1* | 10/2008 | Derchak .............. A61B 5/0205 600/529 |
| 2009/0187392 A1* | 7/2009 | Riskey ................ A01K 11/007 703/11 |

(Continued)

FOREIGN PATENT DOCUMENTS

| DE | 10 2013 221 266 A1 | 4/2014 |
| EP | 0 743 043 A1 | 11/1996 |

(Continued)

OTHER PUBLICATIONS

Dutch Search Report and Written Opinion, dated Jul. 5, 2017 (10 pages).

*Primary Examiner* — Adnan Aziz
(74) *Attorney, Agent, or Firm* — Jacobson Holman, PLLC

(57) ABSTRACT

Method and system for generating at least one attention signal indicating a problem for an animal. The method includes attaching at least one sensor to the animal. The sensor generates information about the movement and/or direction of the sensor. The method analyzes the information to generate one attention signal if there is a problem with the animal. The analysis includes a step of calculating an actual inactive value and generating the signal if a condition is fulfilled. The actual inactive value indicates a length of time the animal was inactive over a recent first time period. When the actual inactive value is greater than a boundary value, attention signal is generated. The system is provided with at least one sensor and a computer for carrying out the analysis on the basis of information received form the at least one sensor.

43 Claims, 2 Drawing Sheets

(56) References Cited

U.S. PATENT DOCUMENTS

Figure 1:
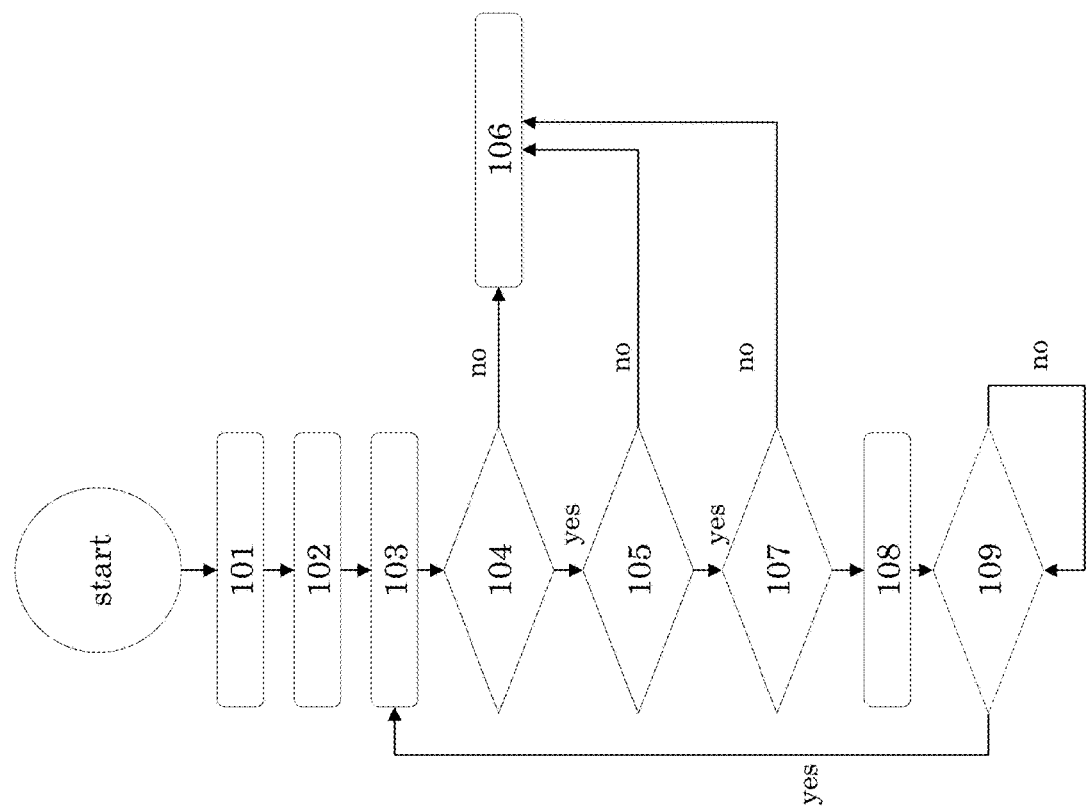

| | | | |
|---|---|---|---|
| 2010/0030036 A1* | 2/2010 | Mottram | A01K 11/00 600/301 |
| 2010/0331739 A1* | 12/2010 | Maltz | A61D 17/008 600/588 |
| 2011/0298619 A1* | 12/2011 | O'Hare | A01K 11/008 340/573.1 |
| 2013/0138389 A1 | 5/2013 | Gyongy et al. | |
| 2013/0281871 A1* | 10/2013 | White | A61B 5/08 600/529 |
| 2013/0282295 A1* | 10/2013 | White | G16H 15/00 702/19 |
| 2015/0057963 A1* | 2/2015 | Zakharov | A61B 5/01 702/131 |
| 2015/0282457 A1 | 10/2015 | Yarden | |
| 2016/0073614 A1* | 3/2016 | Lampe | A01L 11/00 600/408 |
| 2017/0156288 A1* | 6/2017 | Singh | A01K 11/002 |
| 2017/0231198 A1* | 8/2017 | Roisen | A01K 29/005 702/141 |

FOREIGN PATENT DOCUMENTS

| | | |
|---|---|---|
| EP | 1 958 502 A1 | 8/2008 |
| WO | 2008/097111 A1 | 8/2008 |
| WO | 2014/188273 A2 | 11/2014 |
| WO | 2016/053104 A1 | 4/2016 |

* cited by examiner

METHOD AND SYSTEM FOR GENERATING AN ATTENTION SIGNAL INDICATING A PROBLEM FOR AN ANIMAL

The invention relates to a method and a system for generating at least one attention signal relating to at least one animal.

Methods and systems for generating an attention signal relating to animals are known. In current systems a cow is fitted a sensor, such as a temperature sensor. Such systems can derive with relative accuracy the status of a cow from sensor information, such as whether the cow is in heat, or in some cases whether the cow is healthy. The status of the animal is relevant to the farmer as a status change is often associated with an action which is required from the farmer. Often the timing and priority of the action differs with regard to the same status change. A drawback is that the farmer is unable to prioritize the sick cow over the often many other task in his daily or weekly routine. This could allow virulent diseases to spread unnecessarily or a rapidly progressing illness to afflict the animal without timely treatment. Likewise, unnecessary rapid response of the farmer to any status change is bothersome and time consuming. Therefor there exists a need to provide the farmer with the ability to prioritize an animal which requires more immediate attention. Besides illness it is also possible for an animal to become stuck in a physical location. In situations of entrapment the animal often becomes severely stressed or may hurt itself trying to escape its situation. A situation of entrapment may lead to a rapid deterioration of the physical and emotional condition of an animal. Such situations may go undetected or may in some cases even falsely show up as a change in status. This further prevents accurate information relay to the farmer which in turn prevents the farmer from prioritizing the animal.

Accordingly it is an object of the present invention to propose a method and a system that allows a farmer to prioritize the care of an animal. In a more general sense it is thus an object of the invention to overcome or reduce at least one of the disadvantages of the prior art. It is also an object of the present invention to provide alternative solutions which are preferably less cumbersome in assembly and operation and which moreover can be made relatively inexpensively. Alternatively it is an object of the invention to at least provide a useful alternative.

To this end the invention provides a method, according to a first aspect of the invention, for generating at least one attention signal indicating a problem for at least one animal. The method comprises attaching at least one sensor to the at least one animal. The at least one sensor generates sensor information about the movement and/or direction of the at least one animal. The method comprises analyzing the sensor information for generating the at least one attention signal if there is a problem with the at least one animal. The method is characterized in that, the analyzing of the sensor information comprises a step a. in which based on the sensor information an actual inactive value is calculated. The actual inactive value indicates a length of time wherein the at least one animal was inactive over a recent first time period. The method further comprises a step b. in which the at least one attention signal is generated if at least one first condition is fulfilled. According to the first condition the actual inactive value is greater than a boundary value. In this manner the attention signal can convey a sense of urgency as its application is derived from recent inactive behavior of the at least one animal, which can be indicative of a rapidly progressing illness as well as entrapment and immediately serious health issues. It will be understood that such a system will allow the farmer receiving such a signal to prioritize the animal for care.

Optionally, the first time period has at least a predetermined first length. The first time period may be defined such that the end of the first time period is associated with the present time. In that embodiment the first time period provides a time window which moves in time. It will be appreciated that the end of the time period being associated with the present time can be established through updating sensor information to the present at intervals of at least 15 min, such that analysis of sensor information never trails further behind than 15 minutes from the current time. A benefit is that this allows for the timely identification of critically urgent problems and allows for a real time response to problems.

A benefit is that this provides a standard time frame over which the behavior of the animal is analyzed. A further benefit is that the attention signal to convey information on the duration with which a problem has already presented itself.

Alternatively it is also possible that the first time period indicates a recent period wherein the animal was continuously inactive. A benefit is that this allows a recent urgent event to be identified while enabling the farmer to respond thereto while the event remains urgent. This allows for a farmer, when analyzing recent sensor information, to promptly identify an animal in need of urgent care in a time window when such urgent care is still required. In that case it is preferably that the first time period is defined such that the beginning of the first time period is associated with a moment in time wherein the animal became inactive. A benefit is that this allows the attention signal to convey information over the onset of an urgent problem. Optionally, also in this embodiment the end of the first time period may be associated with the present time. Thus this means that the length of the first time period indicates how long the animal has been active recently. It will again be appreciated that the end of the time period being associated with the present time can be established through updating sensor information to the present at intervals of at least 15 min, such that analysis of sensor information never trails further behind than 15 minutes from the current time. A benefit is that this also allows for the timely identification of critically urgent problems and allows for a real time response to problems.

Optionally, out of trend sensor information is omitted for calculating the actual inactive value. It must be noted that animals in need of urgent attention may have short bursts of active behavior. For example when a sick animal which has not moved for a longer time tries to stand up and fails therein. Such short bursts of activity will be found to be out of trend with respect to the overall inactive period it finds itself in. It may otherwise be that an animal which shows such short bursts of activity intermittently over a long inactive period will not be detected as having an urgent problem. By omitting out of trend sensor information such short bursts of activity are also omitted and this will allow for more accurate detection of an urgent problem. It will be appreciated that a trend is a trend with respect to sensor information relating to movement or activity over time within the first time period. It will be further appreciated that the trend can be an average value of sensor information to which being out of trend can be a value laying outside a boundary of two times the standard deviation of sensor information from the average. Note that other forms of trend or outlier analysis can be applied.

Optionally, as discussed, the out of trend sensor information may be information associated with activity of the animal during a period of inactivity. An out of trend time period lays within the first time period. The out of trend time period is shorter than the first time period and has a predetermined out of trend length. A benefit is that this allows one to identify and omit an out of trend time period over the first time period specifically. This can reduce false alarms. Preferably the out of trend length is smaller than the first length.

Optionally, the out of trend time period is between 0-10 minutes, preferably between 0-5 minutes, and more preferably between 0-3 minutes. A benefit is that this limits out of trend behavior to bursts of a length that can be expected from an animal with urgent health problems. This improves the accuracy with which an attention signal is generated and specifically prevents that the generation of attention signals are falsely omitted.

Optionally, the boundary value and/or actual inactive value is adjusted to take into consideration increases or decreases in inactivity arising through group behavior of a group of animals comprising the at least one animal. A benefit is that the effects of social interaction or presence in a herd can be taken into consideration for the behavioral activity. This improves the accuracy with which an attention signal is generated and furthermore prevents false alarms. A benefit is that in the event that two animals in a group of animals each cause the generation of an attention signal, the farmer may choose to prioritize the earliest generated.

Optionally, the at least one attention signal comprises a first attention signal generated for the actual inactive value being greater than the boundary value. The boundary value or actual inactive value may have been adjusted for group behavior. The at least one attention signal may also comprise a second attention signal generated for the actual inactive value being greater than the adjusted boundary value and/or the adjusted actual inactive value being greater than the boundary value and/or the adjusted inactive value being greater than the adjusted boundary value. It will be appreciated that either one of the first and second attention signal can occur first in time. A benefit is that this provides the farmer with a two stage attention mechanism through which an increase in urgency is observed. A benefit is that in the event that two animals in a group of animals each cause the generation of an attention signal, the farmer may choose to prioritize the animal for which both a first and second attention signal has been generated first.

Optionally, the analyzing of the sensor information further comprises a step c. which is prior to step b. in which based on the sensor information the boundary value is calculated. The boundary value may be calculated such that it indicates a length of time wherein the at least one animal was inactive over a second time period. A benefit is that this allows an attention signal to be sent based on a break of behavioral history of the animal. It will be appreciated that the boundary value can also be calculated from the same information from animals of the same species, preferably with the same gender, preferably in the same age group, and preferably in the same physical condition, such as in heat or pregnant, or pregnancy stage.

Optionally, the second time period has a predetermined second length. Preferably the second length is larger than the first length. It is here merely optional that the first time period has at least a predetermined first length.

Optionally, the end of the second time period is associated with the present time. This beneficially allows for the continued gradual updating and changes in the animal's behavior. It will be appreciated that the behavior of an animal may gradually change over time as it ages or with seasonal influences. The above option would beneficially take such effects into consideration boosting the accuracy with which attention signals are generated.

Optionally, step c. comprises averaging a plurality of various lengths of time periods of inactivity of the animal laying within the second time period and which are shorter than the length of the second time period. It will be appreciated that an attention signal can be generated if the actual inactive value exceeds both the boundary value plus a predefined buffer value. This yields:

$$\text{if } \frac{\text{actual inactive value}}{\text{boundary value} + \text{predefined buffer value}} \geq 1$$

$$\text{then generate attention signal}$$

Herein the predefined buffer value is optional. The buffer value may have a value between 0.05 and 1.5 times the boundary value. A benefit is that this reduces false alarms by providing an additional buffer value which must first be overcome prior to generating an attention signal.

Optionally, fringe values of time length, which may occur within the plurality of various lengths of time of inactivity, are omitted for calculating the boundary value. A benefit is that a more accurate boundary value can be defined based on past behavior. This allows for prevention of false alarms.

Optionally, fringe values are statistical outlying values of the plurality of various lengths of time of inactivity, wherein preferably the statistical outlying values are defined as having a length of time laying at least twice the standard deviation away from a mean in a standard distribution of the various lengths of time. It will be appreciated that other statistical means for identifying outliers can be applied hereto.

Optionally, the fringe values are at least a first minimum length of time, wherein the at least one animal is inactive over a recent third time period and at least a first maximum length of time, wherein the at least one animal is inactive over a recent fourth time period. It will be appreciated that fringe values are generally minimum and maximum values of measured lengths of the various lengths of time of inactivity. It may for example be that the animal fell ill before or in the second time period or experienced a multitude of short periods of inactivity with intermittent short periods of activity. Such would constitute fringe values.

Optionally, in step c. the predetermined second length lays in the range of 2-100 days, preferably 5-25 days, and more preferably 5-15 days. A benefit is that this allows for seasonal or specific periodic behavior to be taken into consideration. This reduces the chance of attention signals conveying a sense of false urgency.

Optionally, the predetermined third and fourth time period have a third and fourth time length respectively laying in the range of 0.5-4 days, preferably 0.5-2 days and more preferably 0.5-1.5 days.

Optionally, the predetermined first length lays in the range of 2-48 hours, preferably 3-9 hours, and more preferably 4-8 hours.

Optionally, the actual inactive value should at least be A times greater than the boundary value for generating the at least one attention signal. A lays in the range of 1.05-25, preferably in the range of 1.5-2.5. A benefit is that this will reduce false generation of attention signals. This yields:

$$\text{if } \frac{\text{actual inactive value}}{\text{boundary value}} \geq A$$

then generate attention signal

It will be appreciated that this option may also include a boundary value.

Optionally, in step b. the at least one attention signal is generated only if also at least a second condition is fulfilled. According to the second condition the time wherein the animal is inactive is at least B % of the recent first time period. B lays in the range of 80-99, preferably 90-98, more preferably in the range of 95-97. A benefit is that in this manner an overall sense of inactivity which has to have occurred over a first time period will be taken into consideration regardless of intermittent short bursts of activity.

Optionally, in step b. the at least one attention signal is generated only if also at least a third condition is fulfilled. According to the third condition the time, wherein the animal is inactive is at least C % of a fifth time period. The fifth time period lays within the first time period. The fifth time period is shorter than the first time period. Preferably the fifth time period is defined by the most recent period within the first time period. C lays in the range of 80-99. Preferably in the range of 90-98. Even more preferably in the range of 95-97. The fifth time period may have a fifth length in the range of 15-60 minutes, preferably 20-40 minutes. A benefit is that this prevents attention signal generation for animals which have already shown signs of recovery. The system therewith not only monitors for problems, but also identifies whether the problem has resolved itself and on the basis of this information assesses whether or not to inform the farmer. Though, this would appear a false alarm prevention, it is in fact also a prioritization prevention.

Optionally, the at least one attention signal which is generated in step b. remains valid until after a period of E hours after that the at least one attention signal was generated, a period length of F minutes occurs. The inactive time of the at least one animal is less than G*F minutes. E lays in the range of 6-48 hours. Preferably in the range of 12-36 hours. More preferably 18-32 hours. G lays in the range of 05-0.96. Preferably, in the range of 0.6-0.94. More preferably, 0.8-0.9. A benefit is that this will allow for maintaining the validity of the signal at least until the problem has resolved itself or at least until the problem has been resolved prior to a farmer being able to provide urgent attention.

Optionally, the attention signal remains valid until the at least one animal shows signs of recovery. Signs of recovery are active periods that stretch beyond a short active burst, or that the method comprises identifying the active period using the at least one sensor and preventing the generation of the attention signal. It will be appreciated that such a step can be considered to occur in step a. and can be performed by a computer alongside other steps. A benefit is that recovering animals who are regaining their strength to eat are not brought to the attention of the farmer for requiring urgent attention.

Optionally, on the basis of the at least one attention signal an audible or visible signal is generated, preferably to be detectable by a farmer. A benefit is that the farmer is alerted with immediate effect of an urgency.

Optionally, step c. is repeated or updated in accordance with a predetermined time pattern. A benefit is that this allows for a gradual behavioral change over time to be reflected in the boundary value.

Optionally, step c. is repeated or updated every H days in time, wherein H lays in the range of 0.5-2.5, preferably in the range of 0.75-1.25.

Optionally, the second time period ends at the end of a calendar day, and optionally begins at a calendar day. A benefit is that this provides a more intuitive selection of the second time period. Additionally, this would allow the second time period to range over whole days which concur with the natural waking cycle of the animal. This would further allow for the equal inclusion of daily inactivity in the second time period. The latter prevents favoring night-time or morning data over the other parts of a day in the overall measurement and determination of a boundary value. In theory, this could make specific parts of the day more prone to yielding false alarms. False alarms being the generation of an attention signal while there is no problem.

Optionally, the information obtained by means of the at least one sensor is transmitted to a computer. Steps a., and b. are carried out by the computer.

Optionally, the information obtained by means of the at least one sensor is transmitted to a computer, wherein steps a., b. and c. are carried out by the computer.

Optionally, steps b. and c. are carried out after that new information from the sensor is received by the computer.

Optionally, inactive, also inactive behavior, is defined as not moving beyond passive bodily functions, preferably vital bodily functions, such as breathing.

Optionally, after the ceasing of vital bodily functions for a predetermined critical amount of time the at least one attention signal is generated with immediate effect.

Optionally, the at least one sensor is attached to the head, an ear, the neck, a leg, the tail or present in a stomach of the animal. A benefit is that this allows for an easy mode of transportation of the sensor with a relatively low risk of loss of, or damage to, the sensor.

Optionally, the at least one sensor is embedded in a smart tag which is attached to the head, an ear, the neck, a leg, the tail or present in a stomach of the animal.

Preferably the computer to which sensor information is transmitted is embedded in the smart tag or is distinct from the smart tag or wherein the computer is provided with a first processor and a second processor wherein the first processor is embedded in the smart tag and the second processor is distinct from the smart tag. It will be appreciated that any processor herein mentioned may be provided with a clock and a memory for storing sensor data which is to be analyzed. The memory can be SRAM, DRAM, Z-RAM, A-RAM, ROM, PROM, EPROM, EEPROM of RAM, FeRAM, CBRAM, PRAM, SONOS, RRAM, racetrack memory, NRAM, 3D XPoint, or millipede and can be provided to the computer in direct association with the processor.

Optionally, the method is carried out for a plurality of animals. Each animal is provided with at least one sensor for carrying out steps a.-b. of the method.

Optionally, the method is carried out for a plurality of animals. Each animal may be provided with at least one sensor for carrying out step c. of the method.

It will be appreciated that a computer will be capable of carrying out steps a.-c. and all related proceedings according to any relevant embodiment of the first aspect of the invention According to a second aspect of the invention there is provided a system for carrying out a method according to the first aspect of the invention provided with at least one sensor and a computer for carrying out steps a.-b. on the basis of information received form the at least one sensor.

Optionally, the system is arranged for calculating the boundary value based on the sensor information, such that it indicates a length of time wherein the at least one animal was inactive over a second time period. The at least one sensor and the computer are arranged for carrying out this step on the basis of information received from the at least one sensor.

Optionally, the system is provided with a plurality of sensors to be attached to a plurality of animals respectively and a computer for carrying out steps a.-c. according to the first aspect of the invention on the basis of information received from the plurality of sensors respectively.

Optionally, the at least one sensor is provided as part of a smart tag.

Optionally, the computer is a processor provided as part of the smart tag.

Figure 2:
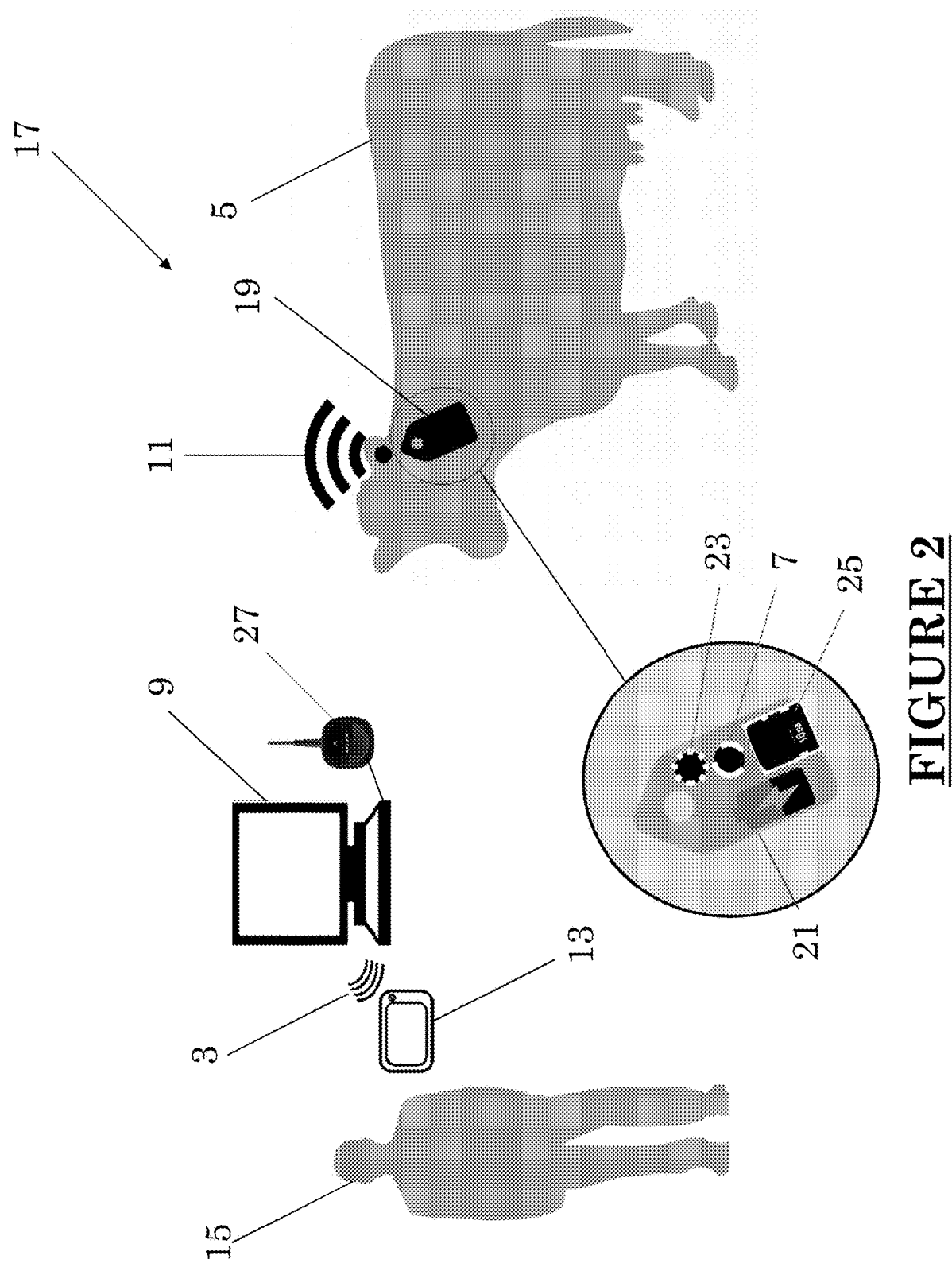

Advantageous aspects of the invention will become clear from the appended description and in reference to the accompanying drawings, in which:

FIG. 1 is a schematic flow diagram of a method for generating at least one attention signal; and FIG. 2 is a schematic system for generating at least one attention signal.

In FIG. 1 shows a schematic flow diagram of a method 1 for generating an attention signal 3, shown in FIG. 2, which indicates a health problem with a cow 5, shown in FIG. 2.

In a first step 101 an omnidirectional accelerometer is provided as a sensor 7, shown if FIG. 2, to the cow 5 to generate sensor information about the movement and direction of the sensor 7. De first step 101 leads to a second step 102.

In the second step 102 the sensor information is transmitted to a computer 9, shown in FIG. 2, via a wireless network 11, shown in FIG. 2. The second step 102 leads to a third step 103.

In the third step 103 the computer analyses sensor information over a second time period. This second time period has a predetermined second length of time of 10 days and which period ends within one calendar day from the present as the second period is updated in intervals of one day by the computer 9. The computer identifies within the second time period a plurality of various lengths of time periods of inactivity of the animal. Each of the plurality of various lengths of time are shorter than the second time period. Each of the plurality of time lengths is a length which corresponds to a moment in time at which inactivity started and the following moment in time at which inactivity ended. From this plurality of various time lengths the computer discards, those time lengths which are smaller than half an hour and those time lengths which are greater than one day. The computer averages the remainder of the plurality of various time lengths and obtains therewith a boundary value.

In the fourth step 104 the computer 9 calculates an actual inactive value based on the received sensor information. The actual value is made to indicate a length of time in which the animal was inactive over a recent first period. This recent first period has a predetermined first length of time which period ends within 15 minutes from the present as the first period is updated in intervals of 15 minutes by the computer 9. Thus in this example the first period is a time window having a fixed length which moves every 15 minutes. Thus it holds that the end of the first time period is associated with the present time. In this example it holds that the end of the first time period is selected on regular moments in time to be the present time. The first time period is in this example a period of 6 hours. In the fourth step the computer 9 determines whether the cow 15 has been inactive as indicated above, with, in this example, the exception of vital movements, within at least 96% of the first time period. Vital movements can be separated from other movements based on their recurrence and intensity. Thus vital movements are not treated as active moments but are treated as being inactive behavior of the animal. For example, breathing movements provide a periodic in and exhaling motion which is a relatively gentile movement. With respect to such vital movements running, chewing and social or physical interaction with other animals stands out in any measurement by the sensor 7.

If yes, the fourth step 104 leads to a fifth step 105.
If no, the fourth step 104 leads to a sixth step 106.
In the fifth step 105 the computer 9 determines whether the cow 5 has been inactive, with the exception of vital movements, within at least 96% of the last 30 minutes of the first time period as known to the computer 9.

If yes, the fifth step 105 leads to a seventh step 107.
If no, the fifth step 105 leads to a sixth step 106.
In the sixth step 106 the computer prevents the emission of the attention signal 3 or to a hand held device with a human interface 13, shown in FIG. 2, of a farmer 15, shown in FIG. 2, who is charged with the care of the cow 5. In this step prevention of the emission of the attention signal 3 can also be seen as the termination of the validity of a previously emitted attention signal 3. Future steps will, further in the example below, be explained to provide the possibility of returning to this step. It will therefor become apparent how a previous attention signal may have been emitted.

In the seventh step 107 the computer determines whether the actual value is at least two times greater than the boundary value.

If yes, the seventh step 107 leads to the eighth step 108.
If no, the seventh step 107 leads to the sixth step 106.
In the eighth step 108 the computer 9 provides the attention signal 3 to a hand held device of the farmer. The attention signal 3, also separate from this example, includes information on the present, such as a time and date, and the temporary nature of the validity of the attention signal 3, such as that the attention signal 3 is valid for 24 hours. This is a validity period. This information is also reported to the farmer 15 on the hand held device 13 in the form of a message. The farmer is herewith informed of a cow related urgency and of the fact that the report has a temporary validity. The hand held device of the farmer also interprets the attention signal 3 and provides an audible alarm to the farmer 15.

In the ninth step 109 the computer 9 determines whether a period of 24 hours has passed since issuing the attention signal 3.

If yes, the ninth step 109 leads to the third step 103. It will be appreciated that the collection of sensor information for the first, second and other time periods continue in parallel to the 24 hours such that no sensor information gap has occurred in said 24 hours. When returning to the third step 103 the need for an attention signal will be evaluated also based on sensor information during said 24 hours. In how far sensor information from during said 24 hours will be used depends on how each mentioned time period is defined in its relation to the present. When this leads to a new attention signal the farmer 15 will understand the validity of the urgency to be renewed. As will be acknowledged by the sixth step 106 the new attention signal becomes the more current attention signal, also known as just the attention signal. The older attention signal then becomes the previously emitted attention signal. When returning to the third step 103 does not lead to a new attention signal, the farmer 15 will understand the urgency to have expired.

If no, the ninth step 109 leads to the ninth step 109. It will be appreciated that the attention signal remains valid as long as said 24 hours have not passed. Within this period of validity no new attention signal is generated.

In another example the attention signal can cause a visual signal on the hand held device 13, such as a light or display area to periodically flash with one flash per thirty seconds. The flash is stopped when no new attention signal is generated after the period of validity and is temporarily maintained when the new attention signal is generated. When the flashing stops, the farmer 15 will know that the urgency has passed. Other forms of visual signaling are possible.

In another example the attention signal can cause an audio signal on the hand held device 13, such as a periodic beep once every 30 seconds. The beep is stopped when no new attention signal is generated after the period of validity and is temporarily maintained when the new attention signal is generated. When the beeping stops, the farmer 15 will know that the urgency has passed. It will be appreciated that visual and audio signals can be emitted from the same hand held device 13.

In FIG. 2 a schematic system 17 for generating the attention signal 3 is shown. Here the sensor 7 is embedded in a smart tag 19. Note that the smart tag 19 is shown magnified. The smart tag 19 is provided on an ear of the cow 5. The smart tag 19 comprises a power source 21. This is also possible for smart tags 19 outside of this example. In this example the power source 21 is a lithium ion battery which powers the sensor 7 and a transmitter 23. In this example the transmitter 23 is a radio transmitter. The smart tag 19 is also provided with a memory 25. In this example the memory is a flash memory. The memory is used for temporary storage of sensor data. Information sent by the transmitter 23 over the wireless network 11 is received at a base station 27 which is communicatively linked to the computer 9 for providing the sent data to the computer 9. It will be appreciated that the smart tag 19 also possesses a processor, which is not shown but customary. The processor controls the transmitter 23 and the sensor 7. The power source 21 is arranged for providing electrical energy to the processor, transmitter 23 and sensor. It will be appreciated that it is also possible for the processor on the smart tag 19, also separate from this example, to fulfill the task of the computer 9. In such a case a base station 27 would be superfluous and the attention signal 3 can be sent, for example over a telephone-/radio- or other wireless network.

It is thus believed that the operation and construction of the present invention will be apparent from the foregoing description and drawings appended thereto. The invention is not limited to the forgoing example as is made clear in the introduction of the specification. For example in step 104 it is alternatively possible that the first time period indicates a recent period wherein the animal was continuously inactive. This means that the first time period does not have a predetermined length. Its length depends on how long in time the animal has been inactive. In that case it is preferably that the first time period is defined such that the beginning of the first time period is associated with a moment in time wherein the animal became inactive. Additionally the end of the first time period may be associated with the present time. Thus this means that the length of the first time period indicates how long the animal has been inactive recently. It will again be appreciated that the end of the time period being associated with the present time can be established through updating sensor information to the present at intervals of at least 15 min, such that analysis of sensor information never trails further behind than 15 minutes from the current time. A benefit is that this allows for the timely identification of critically urgent problems and allows for a real time response to problems.

For the purpose of clarity and a concise description features are described herein as part of the same or separate embodiments, however, it will be appreciated that the scope of the invention may include embodiments having combinations of all or some of the features described throughout the application. It will be clear to the skilled person that the invention is not limited to any embodiment herein described and that modifications are possible which may be considered within the scope of the appended claims. Additions, deletions, and modifications within the purview of the skilled person may generally be made without departing from the scope of the invention, as determined by the claims.

The invention claimed is:

1. Method for generating at least one attention signal indicating a problem for at least one animal, wherein the method comprises attaching at least one sensor to the at least one animal, wherein the at least one sensor generates sensor information about the movement and/or direction of the at least one sensor, and wherein the method comprises analyzing the sensor information for generating the at least one attention signal if there is a problem with the at least one animal, characterized in that, the analyzing of the sensor information comprises the following steps:
   a. based on the sensor information calculate an actual inactive value, wherein the actual inactive value indicates a length of time wherein the at least one animal was inactive over a recent first time period;
   b. generating the at least one attention signal if at least one first condition is fulfilled, wherein according to the first condition the actual inactive value is greater than a boundary value;
   wherein the analyzing of the sensor information further comprises:
      omitting out of trend sensor information from the sensor information for said calculating of the actual inactive value, wherein the out of trend sensor information is information associated with activity of the at least one animal during a period of inactivity, wherein an out of trend time period during which the out of trend information occurs lays within the first time period, and wherein the out of trend time period is shorter than the first time period and has a predetermined out of trend length.

2. Method according to claim 1, characterized in that, the first time period has at least a predetermined first length.

3. Method according to claim 1, characterized in that, the first time period indicates a recent period wherein the animal was continuously inactive.

4. Method according to claim 3, characterized in that, the first time period is defined such that the beginning of the first time period is associated with a moment in time wherein the animal became inactive.

5. Method according to claim 2, characterized in that, the end of the first time period is associated with the present time.

6. Method according to claim 1, wherein the end of the first time period is adjusted on a regular moment in time to reflect the present time.

7. Method according to claim 1, characterized in that, the out of trend time period is between 0-10 minutes.

8. Method according to claim 1, characterized in that, the boundary value or actual inactive value is adjusted to take into consideration increases or decreases in inactivity arising through group behavior of a group of animals comprising the at least one animal.

9. Method according to claim 8, characterized in that, the at least one attention signal comprises,
- a first attention signal generated for the actual inactive value being greater than the boundary value, wherein the boundary value or actual inactive value has been adjusted for group behavior;
- a second attention signal generated for the actual inactive value being greater than the boundary value, wherein the boundary value or actual inactive value has not been adjusted for group behavior.

10. Method according to claim 1, characterized in that, the analyzing of the sensor information further comprises the following step prior to step b.:
- c. based on the sensor information calculating the boundary value such that it indicates a length of time wherein the at least one animal was inactive over a second time period.

11. Method according to claim 10, characterized in that, the second time period has a predetermined second length, wherein preferably the second length is larger than a predetermined first length of the first period.

12. Method according to claim 11, characterized in that, the end of the second time period is associated with the present time.

13. Method according to claim 10, characterized in that, step c. comprises averaging a plurality of various lengths of time periods of inactivity of the animal laying within the second time period and which are shorter than the length of the second time period.

14. Method according to claim 13, characterized in that, fringe values in time length of the plurality of various lengths of time of inactivity are omitted for calculating the boundary value.

15. Method according to claim 14, characterized in that, fringe values are statistical outlying values of the plurality of various lengths of time of inactivity, wherein the statistical outlying values are defined as having a length of time laying at least twice the standard deviation away from a mean in a standard distribution of the plurality of various lengths of time of inactivity.

16. Method according to claim 14, characterized in that, the fringe values are at least a first minimum length of time, wherein the at least one animal is inactive over a recent third time period and at least a first maximum length of time, wherein the at least one animal is inactive over a recent fourth time period.

17. Method according to claim 10, characterized in that, in step c. the predetermined second length lays in the range of 2-100 days.

18. Method according to claim 16, characterized in that, the predetermined third and fourth time period have a third and fourth time length respectively laying in the range of 0.5-4 days.

19. Method according to claim 2, characterized in that, the predetermined first length lays in the range of 2-48 hours.

20. Method according to claim 1, characterized in that, according to the boundary value the actual inactive value should at least be A times greater than the boundary value wherein A lays in the range of 1.05-25, preferably in the range of 1.5-2.5.

21. Method according to claim 1, characterized in that, in step b. the at least one attention signal is generated only if also at least a second condition is fulfilled, wherein according to the second condition the time wherein the animal is inactive is at least B % of the recent first time period, wherein B lays in the range of 80-99.

22. Method according to claim 1, characterized in that, in step b. the at least one attention signal is generated only if also at least a third condition is fulfilled, wherein according to the third condition the time, wherein the animal is inactive is at least C % of a fifth time period, wherein the fifth time period lays within the first time period, and wherein the fifth time period is shorter than the first time period, the fifth time period is defined by the most recent period within the first time period, wherein C lays in the range of 80-99, wherein the fifth time period has a fifth length in the range of 15-60 minutes.

23. Method according to claim 1, characterized in that, the at least one attention signal which is generated in step b. remains valid until after a period of E hours after that the at least one attention signal was generated a period length of F minutes occurs, wherein the inactive time of the at least one animal is less than G*F minutes, wherein E lays in the range of 6-48 hours, and wherein G lays in the range of 0.5-0.96.

24. Method according to claim 1, characterized in that, on the basis of the at least one attention signal an audible or visible signal is generated.

25. Method according to claim 10, characterized in that, step c. is repeated or updated in accordance with a predetermined time pattern.

26. Method according to claim 10, characterized in that, step c. is repeated or updated every H days in time, wherein H lays in the range of 0.5-2.5.

27. Method according to claim 10, characterized in that, the second time period ends at the end of a calendar day.

28. Method according to according to claim 1, characterized in that, the information obtained by means of the at least one sensor is transmitted to a computer, wherein steps a., and b. are carried out by the computer.

29. Method according to claim 10, characterized in that, the information obtained by means of the at least one sensor is transmitted to a computer, wherein steps a., b. and c. are carried out by the computer.

30. Method according to claim 29, characterized in that steps b. and c. are carried out after that new information from the sensor is received by the computer.

31. Method according to claim 1, characterized in that, inactive is defined as not moving beyond passive bodily functions.

32. Method according to claim 1, characterized in that, the at least one sensor is attached to the head, an ear, the neck, a leg, the tail or present in a stomach of the animal.

33. Method according to claim 1, characterized in that, the at least one sensor is embedded in a smart tag which is attached to the head, an ear, the neck, a leg, the tail or present in a stomach of the animal.

34. Method according to claim 1, characterized in that, the method is carried out for a plurality of animals, wherein each animal is provided with at least one sensor for carrying out steps a.-b. of the method.

35. Method according to claim 10, characterized in that, the method is carried out for a plurality of animals, wherein each animal is provided with at least one sensor for carrying out step c. of the method.

36. Method according to claim 33, wherein the information obtained by means of the at least one sensor is transmitted to a computer, wherein steps a., and b. are carried out by the computer, wherein the computer is embedded in the smart tag or is distinct from the smart tag or wherein the computer is provided with a first processor and a second processor, and wherein the first processor is embedded in the smart tag and the second processor is distinct from the smart tag.

37. Method according to claim 31, wherein the passive bodily functions are vital bodily functions.

38. System for carrying out a method according to claim 1 provided with at least one sensor and a computer for carrying out steps a.-b. on the basis of information received from the at least one sensor, wherein the computer is further configured for carrying out the step of omitting the out of trend sensor information from the sensor information for said calculating of the actual inactive value.

39. System according to claim 38, wherein the at least one sensor and the computer are arranged for carrying out step c. on the basis of information received from the at least one sensor; the step c. is calculating the boundary value such that it indicates a length of time wherein the at least one animal was inactive over a second time period.

40. System according to claim 39 provided with a plurality of sensors to be attached to a plurality of animals respectively and a computer for carrying out steps a.-c. on the basis of information received from the plurality of sensors respectively.

41. System according to claim 38, characterized in that, the at least one sensor is provided as part of a smart tag.

42. System according to claim 41, characterized in that, the computer is a processor provided as part of the smart tag.

43. System according to claim 38, wherein the computer is embedded in the smart tag or is distinct from the smart tag or wherein the computer is provided with a first processor and a second processor wherein the first processor is embedded in the smart tag and the second processor is distinct from the smart tag.

* * * * *